United States Patent
Ohno et al.

(10) Patent No.: US 7,518,656 B2
(45) Date of Patent: Apr. 14, 2009

(54) SIGNAL PROCESSING APPARATUS, SIGNAL PROCESSING METHOD, SIGNAL PROCESSING PROGRAM, PROGRAM REPRODUCING APPARATUS, IMAGE DISPLAY APPARATUS AND IMAGE DISPLAY METHOD

(75) Inventors: Tomoyuki Ohno, Zama (JP); Shuntaro Aratani, Machida (JP); Masayoshi Tachihara, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 11/220,550

(22) Filed: Sep. 8, 2005

(65) Prior Publication Data

US 2006/0050183 A1 Mar. 9, 2006

(30) Foreign Application Priority Data

Sep. 8, 2004 (JP) ............................. 2004-260887
Oct. 19, 2004 (JP) ............................. 2004-304359

(51) Int. Cl.
*H04N 7/00* (2006.01)
*H04N 11/00* (2006.01)

(52) U.S. Cl. ....................... 348/462; 348/473; 348/553; 704/275; 704/270

(58) Field of Classification Search ................. 348/515, 348/468, 552, 553, 563, 465, 473, 569, 462, 348/722; 704/235, 251, 270, 275, 231
See application file for complete search history.

(56) References Cited

U.S. PATENT DOCUMENTS 5,659,366 A * 8/1997 Kerman ........................ 725/34
6,075,550 A * 6/2000 Lapierre ........................ 725/25
6,198,511 B1 * 3/2001 Matz et al. ................... 348/553
6,332,120 B1 * 12/2001 Warren ......................... 704/235
2001/0031129 A1 10/2001 Tajima ......................... 386/46

FOREIGN PATENT DOCUMENTS

| JP | 7-240893 A | 9/1925 |
| JP | 63-190438 A | 8/1988 |
| JP | 9-9199 A | 1/1997 |
| JP | 11-46343 A | 2/1999 |
| JP | 11-55613 A | 2/1999 |
| JP | 11-317913 A | 11/1999 |
| JP | 2000-50192 A | 2/2000 |
| JP | 2001-285787 A | 10/2001 |
| JP | 2002-142197 A | 5/2002 |
| JP | 2004-362280 A | 12/2004 |

* cited by examiner

*Primary Examiner*—M. Lee
(74) *Attorney, Agent, or Firm*—Fitzpatrick, Cella, Harper & Scinto

(57) ABSTRACT

A signal processing apparatus comprises: an audio signal detection circuit which detects a specific audio signal from a broadcasting program including an image signal and an audio signal; a control unit which controls an image processing processor, wherein the audio signal detection circuit generates a control signal for controlling the control unit when the audio signal detection circuit detects the specific audio signal, and the control unit controls the image processing processor according to the control signal so as to display a specific image and/or text by synthesizing the specific image and/or text corresponding to the specific audio signal and an image of the broadcasting program displayed according to the image signal.

4 Claims, 16 Drawing Sheets

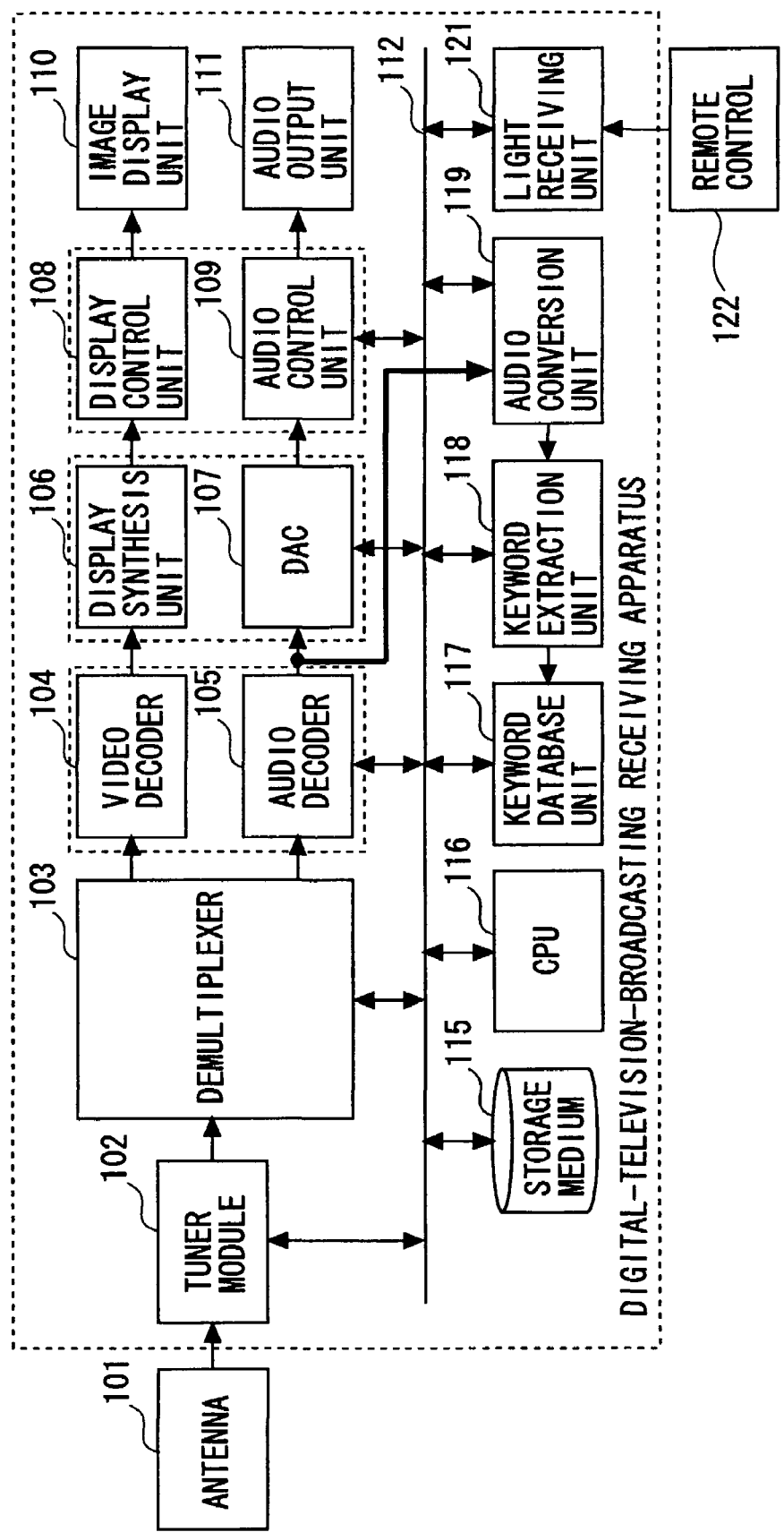

FIG. 6

FIRST KEYWORD TABLE

| INDEX | KEYWORD | | MAXIMUM COUNT VALUE |
|---|---|---|---|
| 0 | PRESENTATION | SECOND KEYWORD TABLE 1 | 10 SECOND |
| 1 | SPONSOR | SECOND KEYWORD TABLE 1 | 10 SECOND |
| 2 | ADDRESS | SECOND KEYWORD TABLE 2 | 5 SECOND |
| 3 | APPLICATION | SECOND KEYWORD TABLE 2 | 5 SECOND |
| ... | ... | ... | ... |
| 60 | VIDEO | SECOND KEYWORD TABLE 3 | 5 SECOND |
| 61 | AUDIO | SECOND KEYWORD TABLE 3 | 5 SECOND |
| 62 | MUSIC | SECOND KEYWORD TABLE 3 | 3 SECOND |
| 63 | PROGRAM | SECOND KEYWORD TABLE 4 | 5 SECOND |

FIG. 7

SECOND KEYWORD TABLE 1

| INDEX | KEYWORD | CONTROL METHOD |
|---|---|---|
| 0 | ABC | INTERNET |
| 1 | DEF | INTERNET |
| 2 | GHI | INTERNET |
| 3 | JKL | INTERNET |
| ... | ... | ... |
| 60 | VAC | INTERNET |
| 61 | — | |
| 62 | — | |
| 63 | — | |

KEYWORD: COMPANY NAME

FIG. 8

SECOND KEYWORD TABLE 2

| INDEX | KEYWORD | CONTROL METHOD |
|---|---|---|
| 0 | POSTAL CODE NUMBER | PRINTER |
| 1 | URL | INTERNET |
| 2 | ADDRESS | PRINTER |
| 3 | — | |
| ... | ... | ... |
| 60 | — | |
| 61 | — | |
| 62 | — | |
| 63 | — | |

FIG. 9

SECOND KEYWORD TABLE 3

| INDEX | KEYWORD | CONTROL METHOD |
|---|---|---|
| 0 | KAZUO ITO | RECORDING APPARATUS |
| 1 | TARO SUZUKI | RECORDING APPARATUS |
| 2 | NORIO YAMAGUCHI | RECORDING APPARATUS |
| 3 | TAKASHI KATO | RECORDING APPARATUS |
| ... | ... | ... |
| 60 | YUJI YAMAMOTO | RECORDING APPARATUS |
| 61 | TAKESHI MATSUMOTO | RECORDING APPARATUS |
| 62 | — | — |
| 63 | — | — |

KEYWORD:PERSON NAME

FIG. 10

SECOND KEYWORD TABLE 4

| INDEX | KEYWORD | CONTROL METHOD |
|---|---|---|
| 0 | NEWS 1 | RECORDING APPARATUS |
| 1 | SPORT 98 | RECORDING APPARATUS |
| 2 | ANIMATION 4 | RECORDING APPARATUS |
| 3 | DRAMA 3 | RECORDING APPARATUS |
| ... | ... | ... |
| 60 | SPORT 12 | RECORDING APPARATUS |
| 61 | VARIETY 8 | RECORDING APPARATUS |
| 62 | — | — |
| 63 | — | — |

KEYWORD:PROGRAM NAME

SIGNAL PROCESSING APPARATUS, SIGNAL PROCESSING METHOD, SIGNAL PROCESSING PROGRAM, PROGRAM REPRODUCING APPARATUS, IMAGE DISPLAY APPARATUS AND IMAGE DISPLAY METHOD

BACKGROUND OF THE INVENTION

1. Field of the Invention

The present invention relates to a digital broadcasting system and a technology used for a receiving apparatus in the system, particularly relates to a signal processing technology which controls the receiving apparatus or a device connected to the receiving apparatus according to an audio signal included in a broadcast wave.

2. Description of the Related Art

Digitization of television broadcasting such as BS digital broadcasting and terrestrial digital broadcasting begins in earnest. In such services of the digital broadcasting, there is data broadcasting which enables a bi-directional service with a receiving user. The data broadcasting is described in "Data broadcasting encoding method and transmission method in digital broadcasting" which is of a standard specification by Association of Radio Industries and Businesses (ARIB).

In the data broadcasting, there is an event message transmission method. In the event message transmission method, message information is sent from a broadcasting station to an application running on a receiving apparatus, and the message information triggers the receiving apparatus to perform a designated operation. For example, a graphic can be multiply-displayed in a program image displayed on a screen connected to the receiving apparatus in synchronization with a showing program, or a data recording apparatus such as D-VHS, a hard disk recorder, and DVC (Digital Video Camera) can be controlled to record program contents, or a printer can be controlled to print the program contents.

Then, a system on the sending side and a data receiving portion and a data restructuring portion on the reception side in the conventional digital broadcasting will be described with reference to FIG. 11 and FIG. 12.

An AV (Audio Visual) contents encoding apparatus 1001 reads data from a VTR device in which video contents data and audio contents data are recorded. The AV contents encoding apparatus 1001 performs compression such as MPEG2 and coding to generate an elementary stream (hereinafter, referred to as ES) including the coded image and audio, and the AV contents encoding apparatus 1001 outputs ES to an AV contents generating/sending apparatus 1002.

The AV contents generating/sending apparatus 1002 synchronizes ES of the image and ES of the audio which are outputted from the AV contents encoding apparatus 1001, and the AV contents generating/sending apparatus 1002 outputs the data to a multiplexer 1009.

A data contents generating apparatus 1003 produces data-broadcasting contents including mono-media data such as BML data, PNG, and JPEG data to form section data, and the data contents generating apparatus 1003 outputs the section data to a data contents sending apparatus 1004.

The data contents sending apparatus 1004 forms a data carousel of a data from the data contents generating apparatus 1003 according to a predetermined sending schedule, and the data contents sending apparatus 1004 sends the data carousel to a multiplexer 1009.

An event message generating apparatus 1005 produces stream descriptors including a general-purpose event message descriptor and a NPT (Normal Play Time) reference descriptor to form the section data, and event message generating apparatus 1005 outputs the section data to an event message sending apparatus 1006.

The data from the event message generating apparatus 1005 is outputted to the multiplexer 1009 with a predetermined sending schedule or at arbitrary timing of an apparatus operator by the event message sending apparatus 1006.

A program information generating apparatus 1007 forms the section data of information on a broadcasting program schedule including EIT (Event Information Table), and the program information generating apparatus 1007 outputs the section data to a program information sending apparatus 1008.

The data from the program information generating apparatus 1007 is outputted to the multiplexer 1009 at predetermined sending timing by the program information sending apparatus 1008.

The multiplexer 1009 generates a transport stream (hereinafter, referred to as TS) by packetizing and multiplexing the stream and the data from the AV contents generating/sending apparatus 1002, the data contents sending apparatus 1004, and the event message sending apparatus 1006, and then the multiplexer 1009 outputs TS to a post-stage digital modulator (not shown).

FIG. 12 is an explanatory view in the case where the image data, the audio data, and the data-broadcasting data are extracted from TS, which is received and demodulated through an antenna and a tuner (not shown) by a demultiplexer 1110, in a conventional digital-broadcasting receiving apparatus.

Referring to FIG. 12, reference numeral 1101 denotes TS in which the pieces of video data, audio data, SI data constituting an electronic program guide (EPG), and data-broadcasting data of plural channels exist in a time division multiplexed manner.

TS is formed in packet (TS packet) unit having a certain size. PID (Packet Identifier) which is of an identifier for identifying a type of data included in the TS packet is given to a header portion 1102 of each TS packet. Table ID which depends on the type of data is given to each of PSI data 1107, SI data 1109, and data-broadcasting data 1108, which are divided in a payload portion 1103 of the TS packet. A section filter 1112 takes the pieces of data of the PSI (Program Specific Information) data 1107, the SI (Service Information) data 1109, and the data-broadcasting data 1108 based on the Table ID, and section filter 1112 sends the data to a data stream processing unit 1106.

When the video data and the audio data are taken out, in a demultiplexer 1110, first the PSI data 1107 existing in the payload portion 1103 of the predetermined TS packet is taken out with a PID filter 1111 and a section filter 1112, and the PSI data 1107 is sent to the data stream processing unit 1106. The PSI 1107 defines the contents of the whole of TS 1101. After a process of analyzing the PSI data 1107, the demultiplexer 1110 takes out the video data and the audio data using the pieces of information on the analyzing process, and the demultiplexer 1110 outputs the video data and the audio data to a video decoder 1104 and an audio decoder 1105.

Then, the data-broadcasting data 1108 will be described. The data-broadcasting data 1108 are mainly divided into (1) DII (Download Info Indication) transmitted by a data carousel transmission method, (2) DDB (Download Data Block), and (3) An event message (stream descriptor) transmitted by an event message transmission method.

(1) DII is the section data for describing a transmission parameter of a data broadcasting contents module including the mono-media data such as the BML data, PNG, and JPEG and the attribute information of each module.

(2) DDB is the section data in which the module is divided into blocks having certain sizes.

(3) The event message (stream descriptor) is used in synchronous and asynchronous message notification for receiving apparatus application by combining the event message with DII and DDB which are transmitted by the data carousel transmission method, and the event message is the section data including the general-purpose event message descriptor and the NPT reference descriptor as described above.

In the receiving apparatus, while the data broadcasting service is received and displayed, the BML contents and the event messages designated by a broadcasting station are always received at the same time with the PID filter 1011 and the section filter 1112, a predetermined control operation is performed by the type of the event message taken and divided.

Japanese Patent Application Laid-Open No. 63-190438 discloses a configuration in which the control is performed by sending the audio signal while the audio signal is mixed with a low-frequency control signal such that a commercial message is not recorded in VTR.

The V-chip is a well known method for previously preventing an underage person from watching a harmful image (refer to Japanese Patent Application Laid-Open No. 11-317913). In the method, the dedicated V-chip installed in a television and so on reads rated data (attribute information such as "adult program" and "parental guidance suggested") added to the contents to determine whether the contents can be displayed or not.

SUMMARY OF THE INVENTION

An object of at least a part of the invention according to the present application is to realize a signal processing apparatus, a signal processing method, a signal processing program, and a program reproducing apparatus which can be compatible with an unconventional, novel program.

Another object of at least a part of the invention according to the present application is to provide an image display apparatus and an image display method which can appropriately control outputs of harmful contents even if attribute information is not added to the contents.

According to the present invention, there is provided a signal processing apparatus comprising: an audio signal detection circuit which detects a specific audio signal from a broadcasting program including an image signal and an audio signal; a control unit which controls an image processing processor, wherein the audio signal detection circuit generates a control signal for controlling the control unit when the audio signal detection circuit detects the specific audio signal, and the control unit controls the image processing processor according to the control signal so as to display a specific image and/or text by synthesizing the specific image and/or text corresponding to the specific audio signal and an image of the broadcasting program displayed according to the image signal.

According to the present invention, there is provided a program reproducing apparatus comprising: the signal processing apparatus; and a speaker which reproduces and outputs the audio signal.

According to the present invention, there is provided a signal processing apparatus comprising: an audio signal detection circuit which detects a plurality of audio signals; and a control unit which controls an interface of a peripheral device, wherein the audio signal detection circuit generates a control signal for controlling the control unit when the audio signal detection circuit detects the plurality of specific audio signals within a predetermined time, and the control unit selectively performs predetermined control of the peripheral device according to the plurality of specific audio signals.

According to the present invention, there is provided a signal processing method comprising: an audio signal detection step of detecting a specific audio signal from a broadcasting program including an image signal and an audio signal; and a control step of controlling an image processing processor by a control unit, wherein the audio signal detection step generates a control signal for controlling the control unit when the audio signal is detected, and the control step controls the image processing processor according to the control signal so as to display a specific image and/or text by synthesizing the specific image and/or text corresponding to the specific audio signal and an image of the broadcasting program displayed according to the image signal.

According to the present invention, there is provided a signal processing method comprising: an audio signal detection step of detecting a plurality of audio signals; and a control step of controlling an interface of a peripheral device by a control unit, wherein the audio signal detection step generates a control signal for controlling the control unit when the plurality of specific audio signals are detected within a predetermined time, and the control step selectively performs predetermined control of the peripheral device according to the plurality of specific audio signals.

According to the present invention, there is provided a signal processing program executing: an audio signal detection step of detecting a specific audio signal from a broadcasting program including an image signal and an audio signal; and a control step of controlling an image processing processor by a control unit, wherein the audio signal detection step generates a control signal for controlling the control unit when the audio signal in the audio signal detection step, and the image processing processor is controlled according to the control signal so as to display a specific image and/or text by synthesizing the specific image and/or text corresponding to the specific audio signal and an image of the broadcasting program displayed according to the image signal.

According to the present invention, there is provided a signal processing program which causes a computer to execute: an audio signal detection step of detecting a plurality of audio signals; and a control step of controlling an interface of a peripheral device by a control unit, wherein the audio signal detection step generates a control signal for controlling the control unit when the plurality of specific audio signals are detected within a predetermined time, and the control step selectively performs predetermined control of the peripheral device according to the plurality of specific audio signals.

According to the present invention, there is provided an image display apparatus comprising: output means for outputting an image and an audio; pattern registering means for causing a user to register a pattern including the image, the audio, or a combination thereof; action designation means for causing the user to designate an action performed in association with the registered pattern; determination means for determining whether the pattern is included in the inputted image signal or audio signal or not; and control means for outputting the stored image signal and audio signal to the output means when the pattern is not included, the control means causing the output means to perform the designated action when the pattern is included.

In an image display apparatus of the invention, it is preferably possible to adopt a configuration in which the action is to output the previously designated image or audio instead of the stored image signal and audio signal.

Further, in an image display apparatus of the invention, it is preferably possible to adopt a configuration in which input means for receiving input from the user is further included and the action is to receive the input from the user with the input means after the outputs of the image signal and audio signal are temporarily stopped. Additionally, in this application, it is preferably possible to adopt a configuration in which the pattern is to determine whether the image of a goods selling price is included in the image signal or not, and after receiving the input of a desired price from the user with the input means, the action is to display the inputted desired price along with the goods selling price of the image signal.

The invention also includes an image display method, in which it is determined whether a previously registered pattern is included in an inputted image signal and/or audio signal or not, and output means for outputting an image and/or audio is caused to perform a previously designated action when the pattern is included.

DESCRIPTION OF THE DRAWINGS

FIG. 1 is a block diagram showing a whole configuration of a digital-television-broadcasting receiving apparatus according to an embodiment of the invention and a peripheral environment thereof;

FIG. 6 shows a first keyword table used in the keyword database unit;

FIG. 7 shows a second keyword table 1 used in the keyword database unit;

FIG. 8 shows a second keyword table 2 used in the keyword database unit;

FIG. 9 shows a second keyword table 3 used in the keyword database unit;

FIG. 10 shows a second keyword table 4 used in the keyword database unit;

DETAILED DESCRIPTION OF THE INVENTION

Preferred embodiment of the invention will be described in detail below with reference to the drawings. However, the scope of the invention shall be not limited to sizes, materials, shapes, relative arrangement, and so on of the components described in the following embodiments unless there is the specified description.

First Embodiment

Figure 2A:
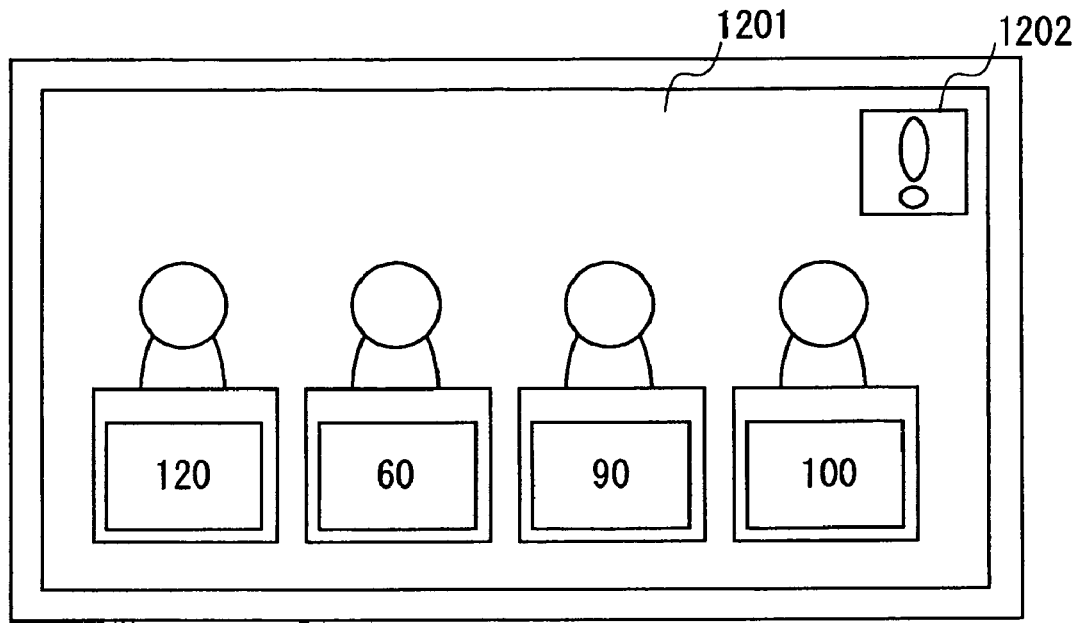
FIG. 2 is a view showing an example of a screen displayed when a receiving apparatus detects a specific audible sound according to an embodiment of the invention.
Figure 2B:
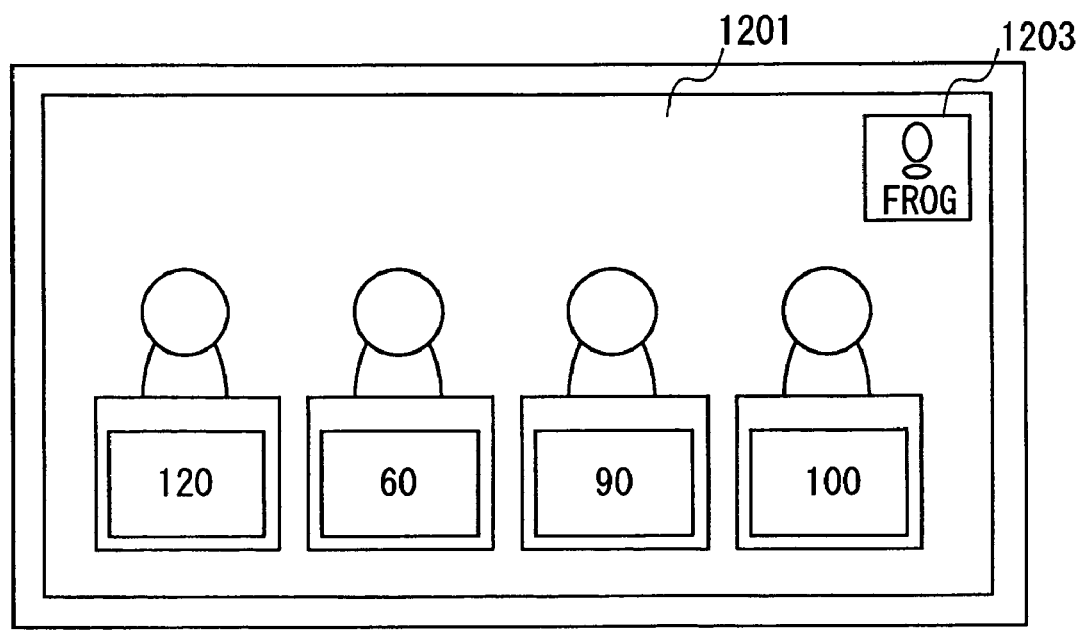
Figure 3:
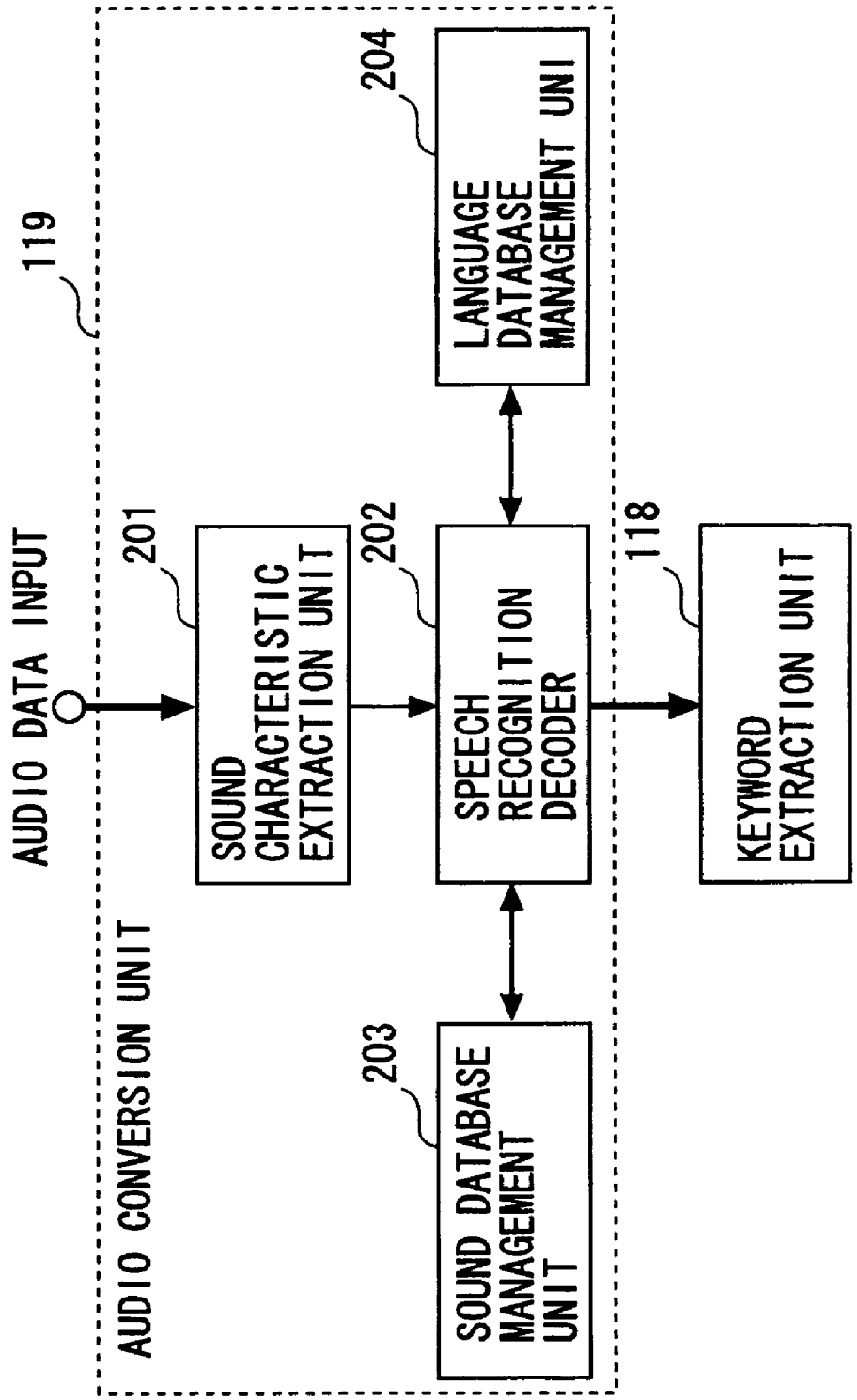
FIG. 3 is a block diagram showing a configuration of an audio conversion unit.

It is assumed that a live quiz program is an example of the broadcasting program to which a first embodiment is applied. Specifically, a program producer side previously determines a specific audible sound (hereinafter referred to as audio keyword) applied during the program, e.g., a correct answer or a word close to the correct answer. The broadcasting station sends the audio keyword to the receiving apparatus by utilizing the way that transmits the conventional data-broadcasting data. The receiving apparatus side detects that a performer of the quiz program sounds the audio keyword. As used herein the detection shall mean detecting that the audio signal includes the audio keyword when the audio signal of the broadcasting program is reproduced to output the audible sound by the receiving apparatus. The multi-display of the graphic (image) denoted by the reference numeral 1202 of FIG. 2A and/or the text denoted by the reference numeral 1203 of FIG. 2B is performed on the upper portion of the image display unit of the receiving apparatus denoted by reference numeral 1201 at the detection timing.

FIG. 1 is a block diagram showing a configuration of a digital-television receiving apparatus for realizing the above control and a peripheral environment thereof. The digital-television-broadcasting receiving apparatus is an example of an audio processing apparatus.

Referring to FIG. 1, the digital-television-broadcasting receiving apparatus according to a first embodiment includes an antenna 101, a tuner module 102, a demultiplexer 103, a video decoder 104, an audio decoder 105, a display synthesis unit 106, DAC 107, a display control unit 108, an audio control unit 109, an image display unit 110, an audio output unit 111, a control bus 112, a storage medium 115, a CPU 116, a keyword database unit 117, a keyword extraction unit 118, an audio conversion unit 119, a light receiving unit 121, and a remote control 122. The image display unit 110 corresponds to an image display unit 1201 of FIG. 2.

Referring to FIG. 1, the signal received by the antenna 101 is inputted to the tuner module 102. The tuner module 102 performs demodulation, error correction, and so on to the inputted signal to form TS, and the tuner module 102 outputs TS to the demultiplexer 103.

The demultiplexer 103 performs taking out control of each data from TS, inputted from the tuner module 102, in which the SI data constituting the pieces of video data, the audio data, and EPG of the plural channels and the data-broadcasting data including the audio keyword and pieces of graphic data (image data) 1202 and 1203 exist in the time division multiplexed manner.

The image data taken out by the demultiplexer 103 is outputted to the video decoder 104, and the decoding process such as MPEG2 is performed. Then, the image data is sent to the display synthesis unit 106.

The audio data taken out by the demultiplexer 103 is outputted to the audio decoder 105, and the decoding process such as MPEG1 and MPEG2 is performed. Then, the audio signal is sent to DAC 107.

The SI data and data-broadcasting data which are taken out by the demultiplexer 103 are temporarily stored in the storage medium 115 through the control bus 112. The CPU 116 reads these pieces of data if necessary, the data decoding process is performed to form display data. The audio keyword and graphic data 1202 which are included in the data-broadcasting data are taken out by the demultiplexer 103, and the audio keyword and graphic data 1202 are registered in the keyword database unit 117 by relating the audio keyword and graphic data 1202 each other.

When the graphic data 1202 is not included in the data-broadcasting data, the keyword and image data which are previously registered in the keyword database unit 117 may be registered while are associated with each other. In this case, the audio keyword included in the data-broadcasting data and the previously registered image data may be registered in the keyword database unit 117 while associated with each other.

The video data decoded by the video decoder 104 is sent to the display control unit 108 through the display synthesis unit 106 to form display data and display timing suitable to the image display unit 110, and video (image) display is performed in the image display unit 110. The display synthesis unit 106 can synthesize the video data with EPG display data and data broadcasting display data which are decoded and formed in the CPU 116.

The audio data decoded by the audio decoder 105 is outputted to DAC 107 and the audio conversion unit 119. DAC 107 performs digital-analog conversion of the audio data to output the audio data to the audio control unit 109. The audio control unit 109 includes a surround output function, an equalizer function, and an output amplifier. The audio control unit 109 performs the output control in each audio channel (for example, left channel and right channel) to perform audio output through the audio output unit 111 which corresponds to a speaker.

A method of extracting a specific keyword from the audio data outputted from the audio decoder 105 to control functions included in the receiving apparatus at the timing of the extraction which is of the feature of the invention will be described below.

In the audio data inputted from the audio decoder 105, a sound characteristic amount such as a frequency is extracted by a sound characteristic extraction unit 201.

Sound database, in which pieces of sound characteristic data of the words are registered, and language database, in which words identifiable in the audio conversion unit 119, are registered are read in a sound database management unit 203 and a language database management unit 204 respectively. These databases are stored in the storage medium 115.

A speech recognition decoder 202 estimates and chooses plural candidates of the words which are presumed to be correct using the language database management unit 204 in which identifiable words are registered. Further, the speech recognition decoder 202 chooses the most probable word from the plural candidates of the words, in which the probable estimation and choice are performed in the above manner, using the sound database management unit 203 in which the pieces of sound characteristic data of the words are registered. Then, the speech recognition decoder 202 converts the audio data into the text data.

The text data converted by the speech recognition decoder 202 is outputted to the keyword extraction unit 118.

The keyword extraction unit 118 removes particles from the converted text data to extract the word which becomes "keyword" for the apparatus control, and the keyword extraction unit 118 outputs "keyword" to the keyword database unit 117.

The keyword database unit 117 compares the word outputted from the keyword extraction unit 118 to the registered audio keyword data. As a result of the comparison, when the word outputted from the keyword extraction unit 118 coincides with the registered audio keyword, the keyword database unit 117 sends a control direction (control signal) to the CPU 116. In accordance with the control direction, the CPU 116 reads the graphic data 1202 of FIG. 2 temporarily stored in the storage medium 115, the CPU 116 performs the decoding process to the graphic data 1202, and the graphic data 1202 is synthesized with the video data by the display synthesis unit 106 (image processing processor) to display the image shown in FIG. 2.

Thus, when the word which becomes "keyword" included in the answer of the performer coincides with the audio keyword such as the correct answer or the word close to the correct answer previously transmitted from the broadcasting station side, the CPU 116 displays the image previously associated with the audio keyword.

The keyword database 117, the keyword detection unit 118 and the audio conversion unit 119 may be mounted on one integrated circuit in the form of rewritable hardware such as FPGA as one integrated circuit or mounted on the plural integrated circuits. The keyword database 117, the keyword detection unit 118 and the audio conversion unit 119 can also be mounted in the form of a software program executed in the CPU 116.

Thus, the specific audible sound (audio keyword) is detected from the inputted audio data, and the predetermined apparatus control is performed according to the timing in which the audio keyword is detected. When compared with the event message by the conventional digital broadcasting system or the apparatus control by the control signal multiplexing technology described in Japanese Patent Application Laid-Open No. 63-190438, the receiving apparatus function control can be performed at the timing which is not intended by the broadcasting station side in the live broadcasting program and so on, and flexibility of the program production is improved. Since the control timing is determined by the audio data, the apparatus which multiplexes the control signal in real time can be eliminated on the sending side such as the broadcasting station.

Second Embodiment

Figure 4:
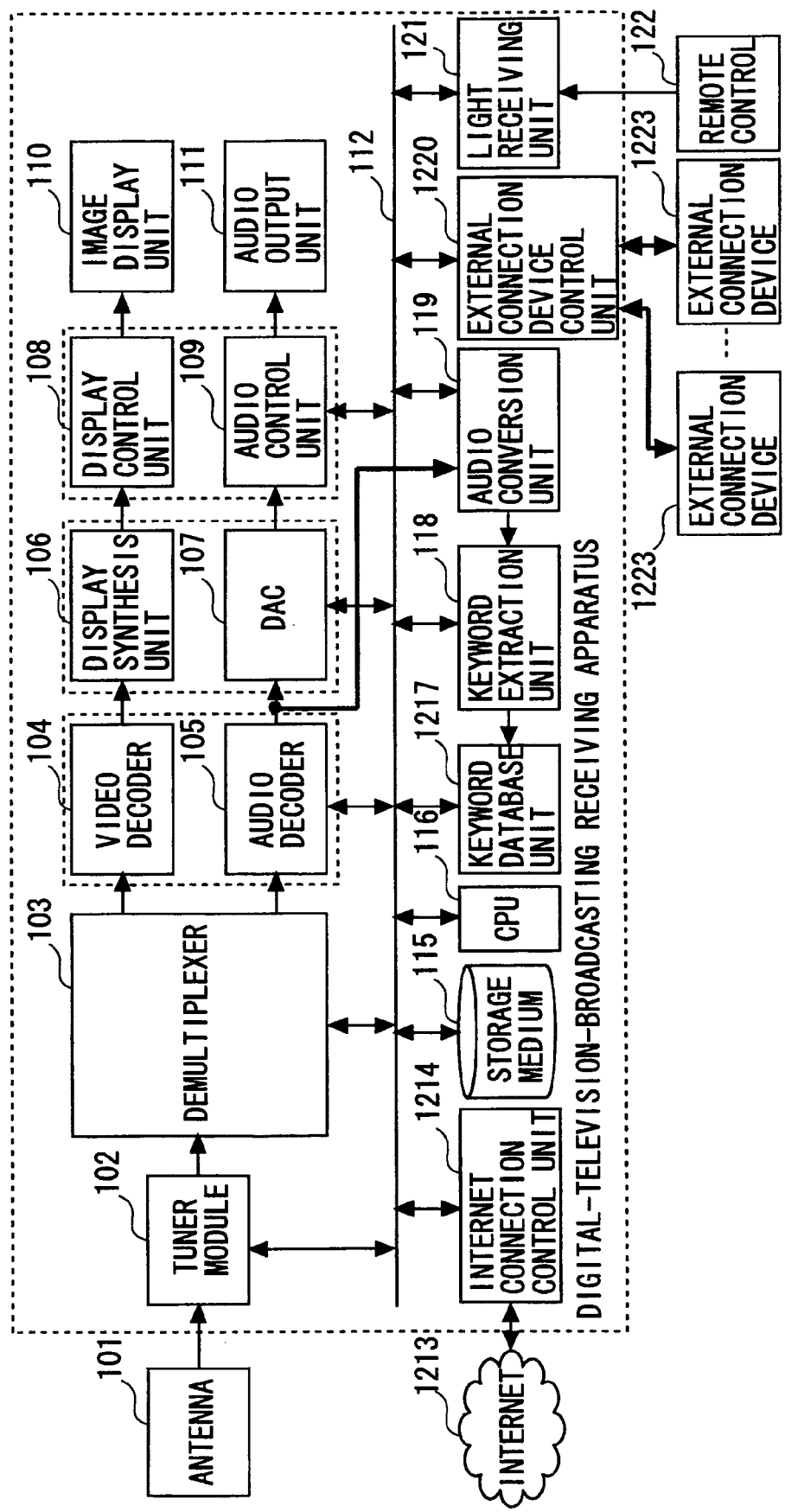
FIG. 4 is a block diagram showing a whole configuration of a digital-television-broadcasting receiving apparatus according to an embodiment of the invention and a peripheral environment thereof.

A second embodiment of the invention will be described below. FIG. 4 is a block diagram showing a whole configuration of a digital-television-broadcasting receiving apparatus according to the second embodiment and a peripheral environment thereof.

Referring to FIG. 4, the digital-television-broadcasting receiving apparatus of the second embodiment includes the antenna 101, the tuner module 102, the demultiplexer 103, the video decoder 104 the audio decoder 105 the display synthesis unit 106 the DAC 107, the display control unit 108, the audio control unit 109, the image display unit 110, the audio output unit 111, the control bus 112, the Internet 1213, an Internet connection control unit 1214, the storage medium 115, the CPU 116, a keyword database unit 1217, the keyword extraction unit 118, the audio conversion unit 119, an external connection device control unit 1220, the light receiving unit 121, the remote control 122, and an external connection device 1223.

An action in which the plural audio keywords are taken out from the audio data in the broadcasting program broadcasted to perform the apparatus function control will be described in the second embodiment. Because the basic action such as the reception and the display of the broadcasting program is similar to the first embodiment, the description will be neglected.

The keyword extraction unit 118 removes the particles from the text data converted by the same action as the first embodiment. The keyword extraction unit 118 extracts the words which become "keywords" for the later-mentioned apparatus control, and the keyword extraction unit 118 outputs the words to the keyword database unit 1217.

Figure 5:
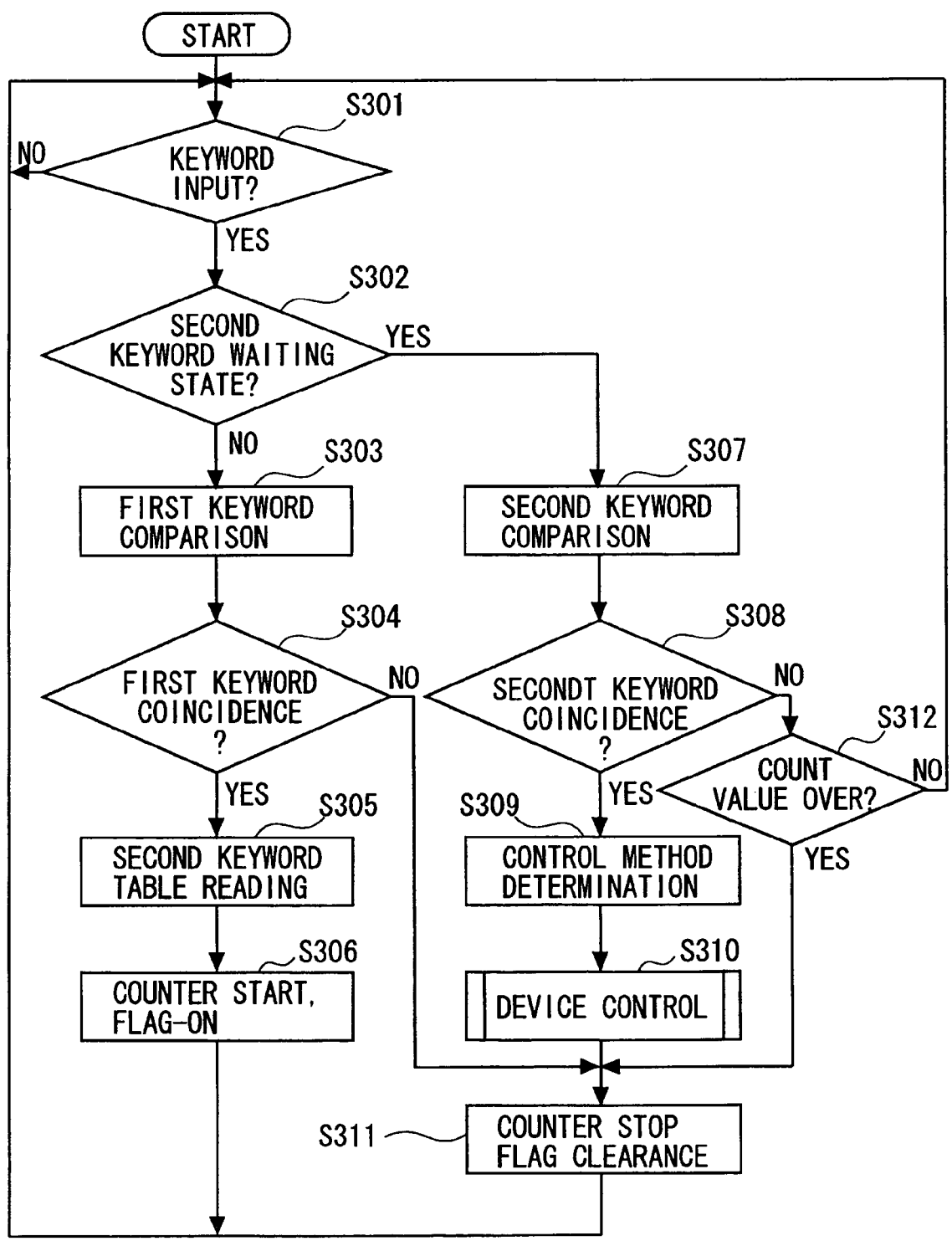
FIG. 5 shows an example of a control flow in a keyword database unit.
Figure 11:
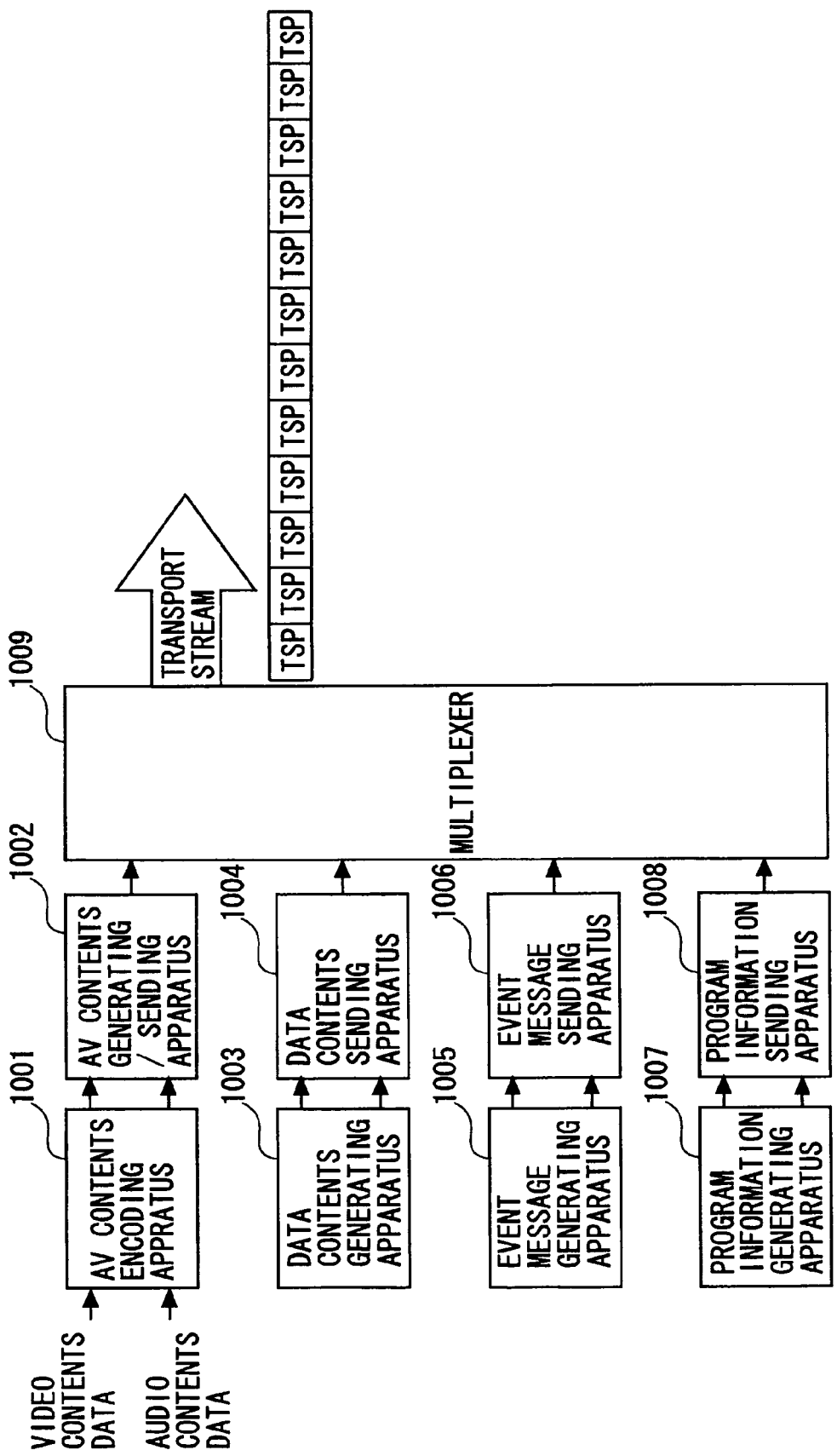
FIG. 11 is a block diagram showing a configuration of a digital-broadcasting sending system according to the related art.

FIG. 5 shows an example of a control flow in the keyword database unit 1217. In the control flow, the peripheral device control and the function control are performed by combination of "keywords" extracted by the keyword extraction unit 118.

FIG. 6 shows "first keyword table" used in the control of FIG. 5. The "first keyword table" is stored in the storage medium 115 of FIG. 4. FIGS. 7 to 10 show "second keyword table 1" to "second keyword table 4" used in the control of FIG. 5. The "second keyword table 1" to "second keyword tables 4" are stored in the storage medium 115 of FIG. 4.

In Step S301 of FIG. 5, the keyword database unit 1217 of FIG. 4 waits the input of the keyword data extracted from the keyword extraction unit 118. When the keyword data is inputted, in Step S302, it is determined whether a "second keyword waiting" state exists or not. The transition to the "second keyword waiting" state will be described later in a part of the action in Step S306. When the "second keyword waiting" state does not exist in Step S302, the flow goes to Step S303. When the "second keyword waiting" state exists in Step S302, the flow goes to Step S307.

In Step S303, it is determined whether the "keyword" inputted from the keyword extraction unit 118 of FIG. 4 is registered in the "first keyword table" shown in FIG. 6.

In Step S304, when the "keyword" inputted from the keyword extraction unit 118 of FIG. 4 is not registered in the "first keyword table" shown in FIG. 6, the flow goes to Step S311. On the contrary, when the "keyword" inputted from the keyword extraction unit 118 of FIG. 4 is registered in the "first keyword table" shown in FIG. 6, the flow goes to Step S305.

Citing a specific example in Step S304, when the "keyword" inputted from the keyword extraction unit 118 of FIG. 4 is the keyword of "presentation", the keyword of "presentation" is registered in index 0 of the "first keyword table" shown in FIG. 6, so that the flow goes to Step S305.

In Step S305, when a first keyword is registered, any one of the "second keyword tables" shown in FIG. 7 to FIG. 10 is read from the storage medium 115 of FIG. 4 in order to perform second keyword comparison described in the processes from Step S307.

The "second keyword table" read in Step S305 is determined based on the processing result in Step S304. For example, when the keyword inputted from the keyword extraction unit 118 of FIG. 4 is the keyword of the "presentation", the "second keyword table 1" is read as described in "referenced table" of the first keyword table shown in FIG. 6. When the keyword inputted from the keyword extraction unit 118 of FIG. 4 is the keyword of "program", the "second keyword table 4" is read as described in "referenced table" of the first keyword table.

In Step S306, a counter is started in order to count an input time interval between the first keyword and the second keyword in Step S301, and a flag indicating the "second keyword waiting" state is set. Then, the flow returns to Step S301, and the next keyword input is waited. A "maximum count value" described in the "first keyword table" of FIG. 6 is used as the maximum count time in the counter.

As described above, in Step S302, it is determined that the "second keyword waiting" state exists. Therefore, in Step S307, it is determined whether the "keyword" inputted from the keyword extraction unit 118 of FIG. 4 is registered in any one of the "second keyword tables" shown in FIG. 7 to FIG. 10. The "second keyword table" used in Step S307 is one which is already read in Step S305.

In Step S308, as a result of the comparison in Step S307, when the "keyword" inputted from the keyword extraction unit 118 of FIG. 4 is registered in the "second keyword table", which is already read as described above the flow goes to Step S309. On the contrary, when the "keyword" is not registered in the "second keyword table", the flow goes to Step S312. In Step S312, it is determined whether the input time interval between the first keyword and the second keyword, started in Step S306, exceeds a predetermined count value. When the input time interval exceeds the predetermined count value, the flow goes to Step S311. In Step S311, the counter value started in Step S306 and the flag indicating the "second keyword waiting" state are cleared, and the transition to the "first keyword waiting" state is performed. Then, the new keyword input is waited in Step S301. When the input time interval does not exceed the predetermined count value, while the "second keyword waiting" state exists, the new keyword input is waited in Step S301.

In Step S309, as a result of the coincidence of the "second keyword" in Step S308, the apparatus control method is determined according to each of "control methods" described in the second keyword tables 1 to 4.

For example, when the "first keyword" inputted from the keyword extraction unit 118 of FIG. 4 is the keyword of the "presentation", and when the "second keyword" is "ABC" (for example, company name in this case), Internet connection control is performed to connect the Internet 1213 through the Internet connection control unit 1214 of FIG. 4.

When the "first keyword" inputted from the keyword extraction unit 118 of FIG. 4 is the keyword of "address", and when the "second keyword" is "postal code number", printer control is performed. The video frame data is taken out from the display control unit 108 of FIG. 4, and the printer (corresponding to external connection device 1223) connected through the external device control unit 1220 is controlled to print the video frame data taken out.

When the "first keyword" inputted from the keyword extraction unit 118 of FIG. 4 is the keyword of "program", and when the "second keyword" is "drama 3" (for example, broadcasted program name in this case), the control of a recording apparatus (for example, D-VHS device) is performed. The desired program data stream is taken out from the demultiplexer 103 of FIG. 4, and the recording apparatus (corresponding to external connection device 1223) connected through the external device control unit 1220 is controlled to record the stream data taken out. In this case, the recording apparatus (corresponding to external connection device 1223) connected through the external device control unit 1220 is controlled. However, the storage medium 115 of FIG. 4 may be controlled to record the stream data taken out.

As described above, in the external device control unit 1220, the plural kinds of the external connection devices 1223 are connected to the plural ports (interfaces). The CPU 116 controls the interfaces of the peripheral devices according to the plural keywords (specific audio signals), and the CPU 116 selectively performs the predetermined control of the chosen peripheral device. When the wired connection is performed between the external device control unit 1220 and the plural external connection devices 1223, output terminals may be provided as an output unit of the apparatus control signal. When the wireless connection is performed between the external device control unit 1220 and the plural external connection devices 1223, a wireless signal output control circuit may be provided.

After the above apparatus control and function control in Step S310, the flow goes to Step S311. In Step S311, the counter started in Step S306 is stopped to clear the counter value, and the flag indicating the "second keyword waiting" state is cleared to set the "first keyword waiting" state. Then, the flow returns to Step S301.

The keyword registered in the keyword table described above can be registered and updated in the keyword table by extracting the keyword with the CPU 116 from the SI data given to the watching program. In this case, as described above, the CPU 116 reads the SI data associated with the watching program which is temporarily stored in the storage medium 115. Similarly to the function in the keyword extraction unit 118, the CPU 116 removes the particles from the fields of program name information, program contents description information, and performer information which are described in the SI data, and the CPU 116 extracts the word which becomes the "keyword" for the later-mentioned apparatus control and function control to output the word to the keyword database unit 1217. Then, the keyword database unit 1217 registers and updates the keyword inputted from the CPU 116 in the "second keyword tables" shown in FIG. 7 to FIG. 10, and the keyword is stored in the storage medium 115. Further, the keyword may be registered and updated in the keyword table by the user operation of the receiving apparatus with the remote control 122.

As described above, the specific audio keyword is detected from the inputted audio data, and the predetermined control determined by the audio keyword is performed according to the detection of the specific audio keyword. Therefore, not only the control in which it is believed that many users receiving the broadcast commonly gain profit, but the various controls such that the user receiving the broadcast individually performs the control according to user's preference, can be performed unlike the event message by the conventional digital broadcasting system. Since the only input is the audio data, it is not necessary to generate the control signal separately from other signals on the sending side such as the broadcasting station, and the apparatus which generates the control signal and the apparatus which sends the control signal are not required on the sending side.

Third Embodiment

A third embodiment of the invention will be described below. As with the second embodiment, a block diagram showing the whole configuration of a digital-television-broadcasting receiving apparatus according to the third embodiment and a peripheral environment thereof are identical to FIG. 4.

The third embodiment is configured to register and update the keyword data, the language database, and the sound database data by download from a server (not shown) which is exists on the Internet through the Internet connection control unit 1214. The keyword data is stored in the storage medium 115, and registered in the keyword table used in the keyword database unit 1217. The identifiable word used in the audio conversion unit 119 is registered in the language database. The sound characteristic data of the word is registered in the sound database data.

Further, the third embodiment is configured to be able to change the keyword data, the language database, and the sound database by category information or a channel number. The category information to which the watching program belongs is obtained from the SI data to which the CPU 116 of FIG. 4 performs the decoding process. The channel number is designated by the user trough the remote control 122.

Thus, the combination of the keywords which becomes the trigger for controlling the functions of the peripheral device and receiving apparatus or a difference in sound characteristics of the pieces of audio data depending on the program can be changed more flexibly, so that user-friendliness of the receiving apparatus can further be improved.

Fourth Embodiment

A fourth embodiment of the invention will be described below. As with the second embodiment, a block diagram showing the whole configuration of a digital-television-broadcasting receiving apparatus according to the fourth embodiment and a peripheral environment thereof are identical to FIG. 4.

In the receiving apparatus of FIG. 4, the data stream including the audio data can be received from the device such as the D-VHS device (for example, corresponding to external connection device 1223) which can record and reproduce the program data stream. In the reproduction, as with the second embodiment, the peripheral device connected to the receiving apparatus or the function included in the receiving apparatus can be controlled by the combination of the keywords extracted from the audio data.

At this point, when a part of the control functions are disabled, the trouble with the device control in which the combination of the keywords such as "recording data in D-VHS device" is included can be previously prevented in afterward reproducing and watching the program data recorded by the D-VHS device and so on.

Figure 12:
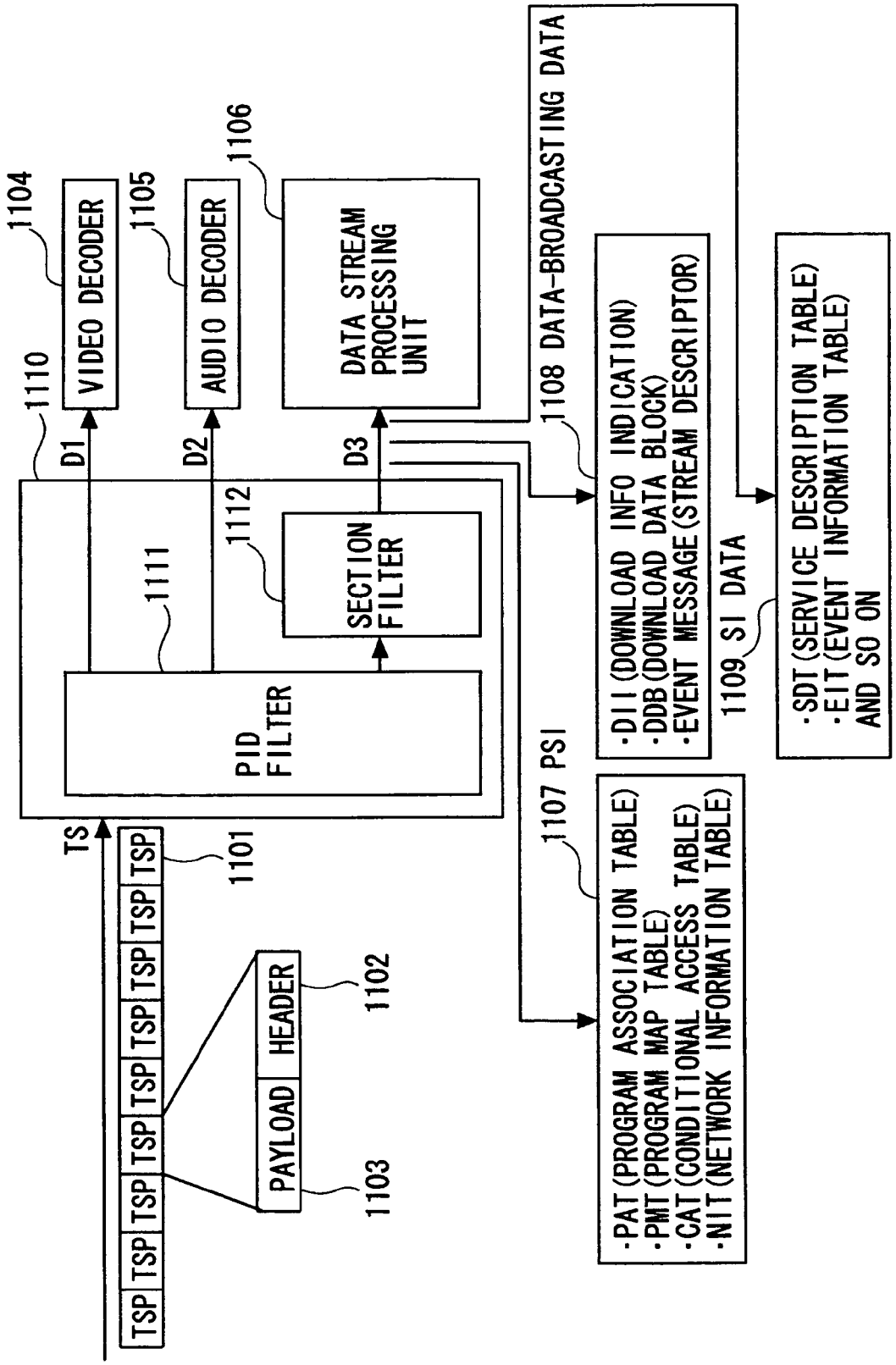
FIG. 12 is an explanatory view in the case where images, audio data, data-broadcasting data, and so on are extracted in a digital-broadcasting receiving apparatus according to the related art.

In the above embodiments, the device such as the D-VHS device which can record and reproduce the TV broadcast wave through the tuner module 102 is used as an example of the audio signal data input means for extracting the keyword. Alternatively, audio input means such as a microphone is connected to the receiving apparatus of FIG. 12, and the keyword is extracted from the user's voice inputted through the microphone. Therefore, the peripheral device connected to the receiving apparatus or the function included in the receiving apparatus can be controlled.

The above embodiments has the configuration in which the peripheral device connected to the receiving apparatus or the function included in the receiving apparatus is controlled by the combination of the keywords extracted by the keyword extraction unit 118 of FIG. 4. However, the same control as the fourth embodiment can be performed with only one keyword or the combination of three or more keywords by changing the control flow of FIG. 5 or by changing and adding the keyword tables shown in FIG. 6 to FIG. 10.

The program described in the above embodiments includes a commercial message (so-called CM), a company name or a product name is set at the audio keyword, and the audio keyword is detected. Therefore, product information is taken out from the Internet, and the product information may be stored in the storage medium 115 of FIG. 1 or FIG. 4 or the product information may be printed with the printer. At this point, search is executed through the Internet while the detected audio keyword is used as the search keyword.

In the above embodiments, the receiving apparatus shown in FIG. 1 or FIG. 4 is described as an example of the invention. However the invention is not limited to the receiving apparatus as long as the apparatus performs the audio processing. The invention includes the method performed by the procedures shown in the above embodiments, the program which causes the apparatus such as the receiving apparatus to execute the method, and the storage medium in which the program is recorded.

The signal processing apparatus, the signal processing method, the signal processing program, and the program reproducing apparatus which are able to be compatible with the unconventional, novel program can be realized according to the invention.

Thus, the plural configurations of the embodiments are described above. However, in the invention, various configuration can be adopted other than the above embodiments. Although the audio keyword is detected in the above embodiments, the configuration in which the specific image is detected can also be adopted. Further, the detection target is not specified on the sending side (broadcasting main body such as broadcasting station or program producer), but the detection target can be specified on the receiving side. Then, some other embodiments will be described.

Fifth Embodiment

Figure 13:
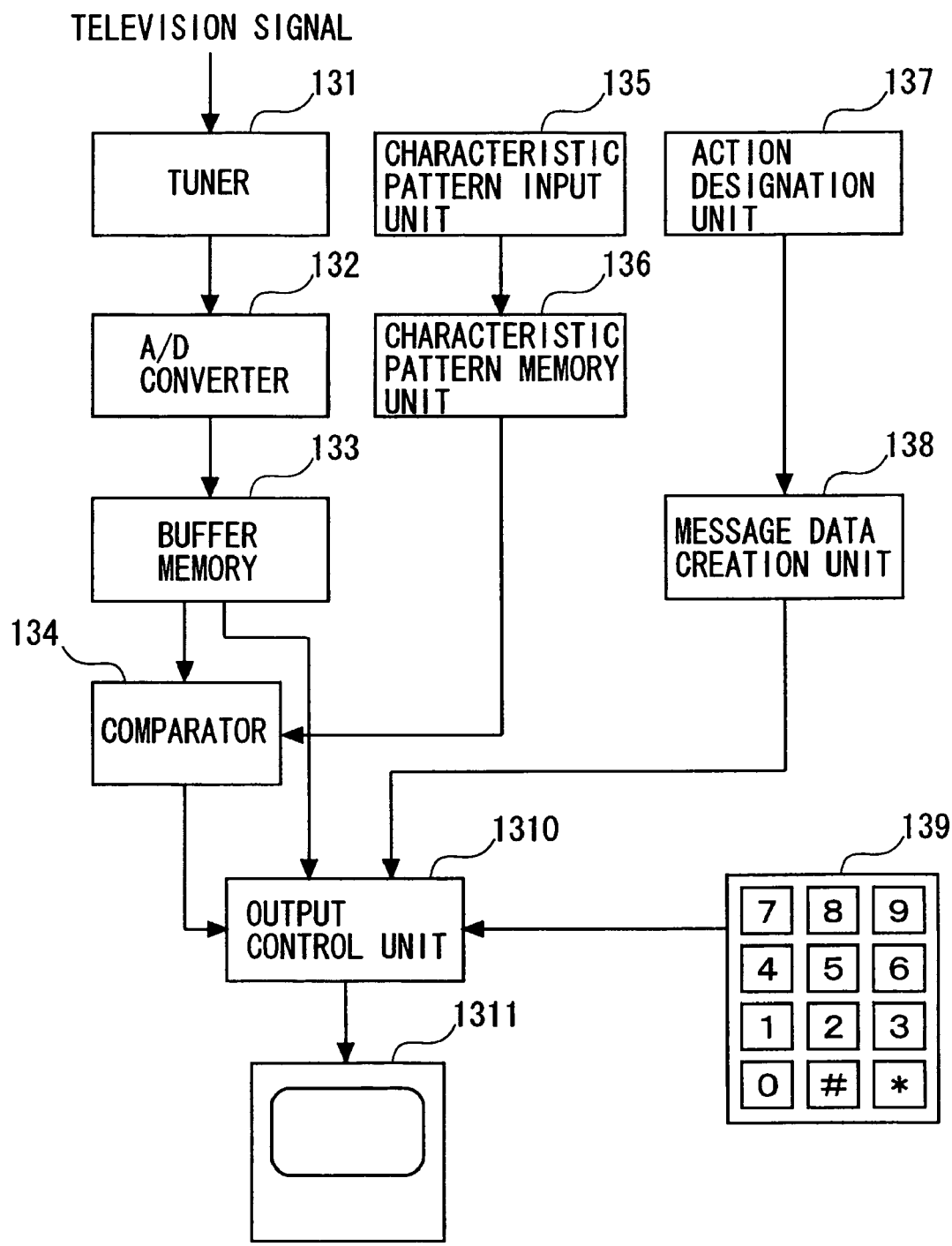
FIG. 13 is a view showing a configuration of a television apparatus according to an embodiment of the invention.

FIG. 13 shows a configuration of a television apparatus according to a fifth embodiment.

The television apparatus includes a tuner 131, an A/D CONVERTER 132, a buffer memory 133, a comparator 134, a characteristic pattern input unit 135, a characteristic pattern memory unit 136, an action designation unit 137, a message data creation unit 138, a controller 139, an output control unit 1310, and a display 1311.

The tuner 131 receives a television signal such as the image broadcast through the wireless broadcasting, the cable broadcasting, or the Internet. The tuner 131 generates an analog video signal (image signal) and an analog audio signal (audio signal) from the television signal.

A/D converter 132 converts the image signal and audio signal, inputted from the tuner 131, into a digital signal. The buffer memory 133 is storage means for temporarily storing the image signal and the audio signal after the digital conversion. In the buffer memory 133, access is performed in a FIFO (first-in first-out) manner.

The characteristic pattern input unit 135 has the function of causing the user to input a characteristic pattern (hereinafter simply referred to as "pattern") including the image, the sound, or the combination thereof. For example, the plural kinds of the patterns previously prepared are displayed on the display 1311, and the user may choose the pattern from the plural kinds of the patterns. Alternatively, the user may freely input the pattern. The inputted pattern is registered in the characteristic pattern memory unit 136. That is, in the fifth embodiment, the characteristic pattern input unit 135 and the characteristic pattern memory unit 136 correspond to the pattern register means of the invention.

The pattern is inputted by utilizing the controller 139. The controller 139 is input means for receiving the input from the user. A ten-key type controller may be used as the controller 139, or a keyboard type controller and a pointing-device type controller may also be used as the controller 139. The controller which is commonly used as a remote control of the television apparatus may be used as controller 139, and GUI displayed on the screen when the display 1311 is formed by a touch panel may be used as the controller 139.

The action designation unit 137 has the function (action designation means) of causing the user to designate the action executed in association with the pattern registered in the characteristic pattern input unit 135. The action is the process performed by the main body apparatus or the display 1311. Examples of the action includes the action in which the screen is set undisplayed, the action in which the sound is muted, the action in which the screen is paused, the action in which the previously designated image and sound are outputted instead of the image signal and the audio signal, and the action in which the user input is received through the controller 139 after the outputs of the image signal and audio signal are paused (temporarily stopped). The message data creation unit 138 has the function of producing the message (image) displayed on the display 1311 in performing the action.

The comparator 134 has the function (determination means) of determining whether the pattern registered in the characteristic pattern memory unit 136 is included in the image signal or audio signal which is temporarily stored in the buffer memory 133. The technologies such as image recognition, speech recognition, pattern matching may be utilized for the determination process. Because the existing technology can be utilized for these technologies, the detailed description will be neglected. The determination result (comparison result) in the comparator 134 is delivered to the output control unit 1310.

The output control unit 1310 has the function (control means) of controlling the image and audio which are outputted to the display 1311 according to the determination result received from the comparator 134. Specifically, the output control unit 1310 outputs the image signal and the audio signal to the display 1311 when the determination result is "false" (namely, when the pattern is not included in the image signal or the audio signal) On the contrary, when the determination result is "true" (namely, when the pattern is included), the output control unit 1310 causes the display 1311 to perform the action associated with the pattern.

According to the above configuration, when the pattern included in the harmful contents is previously registered on the user side, the television apparatus automatically distinguishes the contents corresponding to the pattern to appropriately restrict the output of the contents. Therefore, it is not necessary that the attribute information such as the rated data is added to the contents on the contents supplier side.

The television apparatus may be configured to incorporate the tuner 131, or the television apparatus may be configured by the combination of the image display apparatus and the external device, such as STB (Set Top Box) and VTR, including the tuner function.

SPECIFIC CONSTRUCTION EXAMPLE 1 IN FIFTH EMBODIMENT

In a construction example 1, the specific operation of the television apparatus will be described by citing the so-called TV shopping program (mail-order selling is performed by introducing goods) as an example of the contents.

Figure 14:
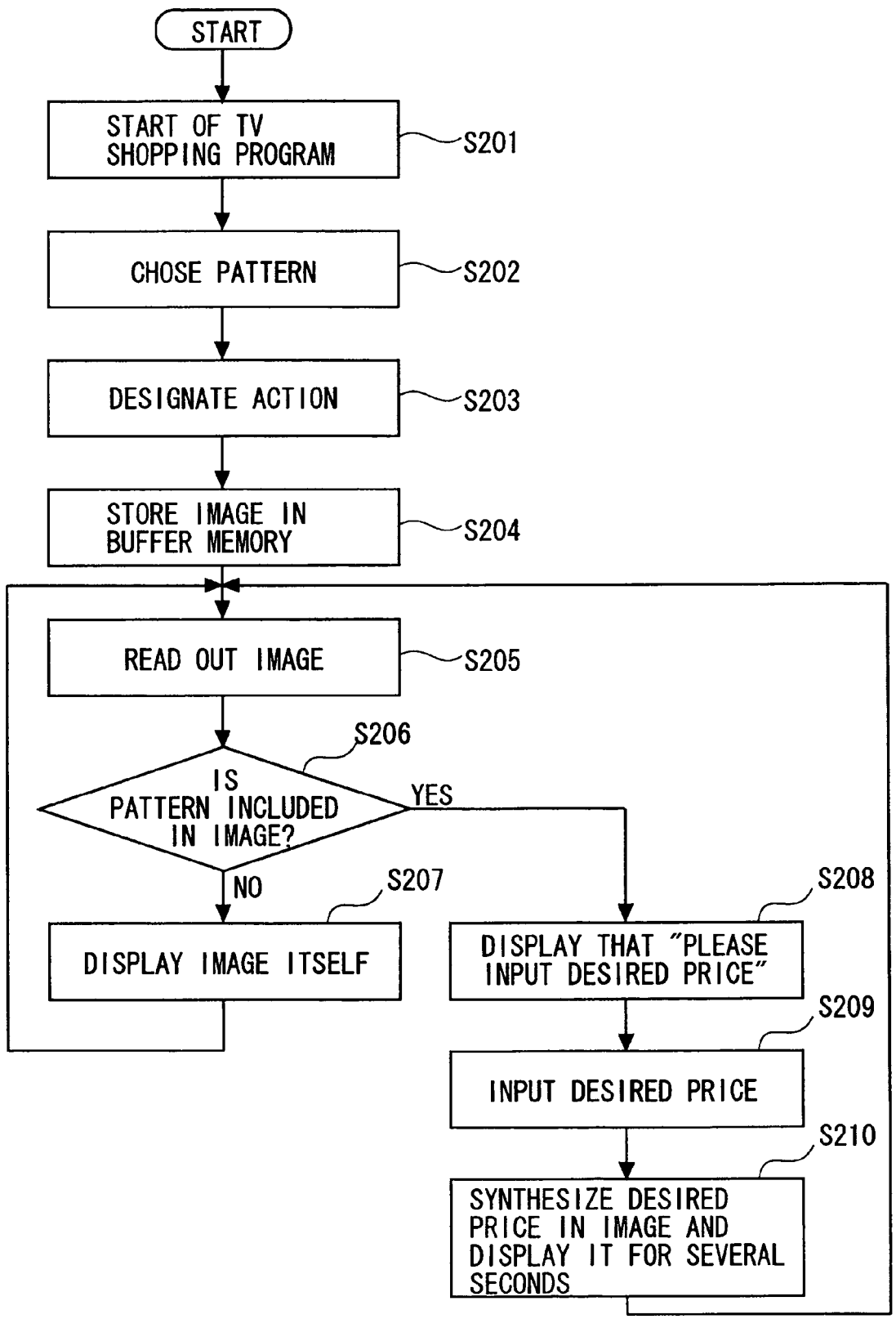
FIG. 14 is a flowchart showing a process flow in an embodiment.

FIG. 14 is a flowchart showing the process flow in the construction example 1. In FIG. 14, the underlined part indicates the operation of the user, and the other indicates the operation of the main body apparatus.

First the apparatus is turned on to start to watch the television program (Step S201).

When the TV shopping program is started, the user inputs the pattern through the characteristic pattern input unit 135 (Step S202). Specifically the user presses a "*" button of the controller 139 to run the characteristic pattern input function. Then, the characteristic pattern input unit 135 displays the previously prepared list of the patterns on the display 1311. The user chooses the desired pattern from the pattern list by operating a numeric button of the controller 139. At this point, it is assumed that two patterns of "Yen" and "Y" are chosen. "Yen" and "Y" are the pattern which determines whether the image of a goods selling price is included in the image signal or not. The chosen pattern is registered in the characteristic pattern memory unit 136.

When the pattern choice is completed, the flow goes to an action designation process. The action designation unit 137 displays the previously prepared action list on the display 1311. The action list corresponding to the pattern chosen in Step S202 is displayed. The user chooses the desired action from the action list by operating the numeric button of the controller 139. At this point, it is assumed that the contents that "when "Yen" or "Y" emerges, the image is undisplayed to encourage the user to input a desired price and the value of the desired price is displayed while superimposing the screen on which the goods price is shown" are chosen as the action.

Thus, when the pattern and the action are designated, the apparatus performs the A/D conversion of the image signal inputted from the tuner 131, and the apparatus stores the image data of each frame in the buffer memory 133 (Step S203). The apparatus performs the same processes for the audio signal.

The comparator 134 reads the image from the buffer memory 133 in the FIFO manner (Step S204) to determines whether the patterns of "Yen" or "Y" is included in the image by the image recognition process (Step S205).

When the pattern is not included (NO in Step S206), the image is directly displayed on the display 1311 (Step S207). The audio is also outputted at the same time.

When the pattern is included (YES in Step S206), i.e., when the good selling price is included in the image, the display and the sound output are temporarily stopped. However, the process of storing the image and audio to which the A/D conversion is performed is continuously performed.

The message data creation unit 138 generates the image of "Please input desired price" and the output control unit 1310 displays the generated image on the display 1311 (Step S208). The user can input the desired price by operating the numeric button of the controller 139 (step S209).

When the input of the desired price is finished, the output control unit 1310 converts the desired price into the image to synthesize the image of the desired price onto the image in which the pattern is included (goods selling price is included). At this point, the synthesizing process is performed such that the goods selling price and the desired price do not overlap each other. The output control unit 1310 displays the synthesized image on the display 1311 (Step 210). The user can compare the actual goods selling price to the desired price by watching the synthesized image. After the synthesized image is displayed for several seconds, the comparator 134 and the output control unit 1310 read the subsequent data from the buffer memory 133 to continue the determination process.

In the construction example, the users do not passively watch the TV shopping, but the users can take the time when the users can determine the goods price by themselves. Therefore, there is a merit that the users can quietly make the purchase determination.

CONSTRUCTION EXAMPLE 2

Figure 15A:
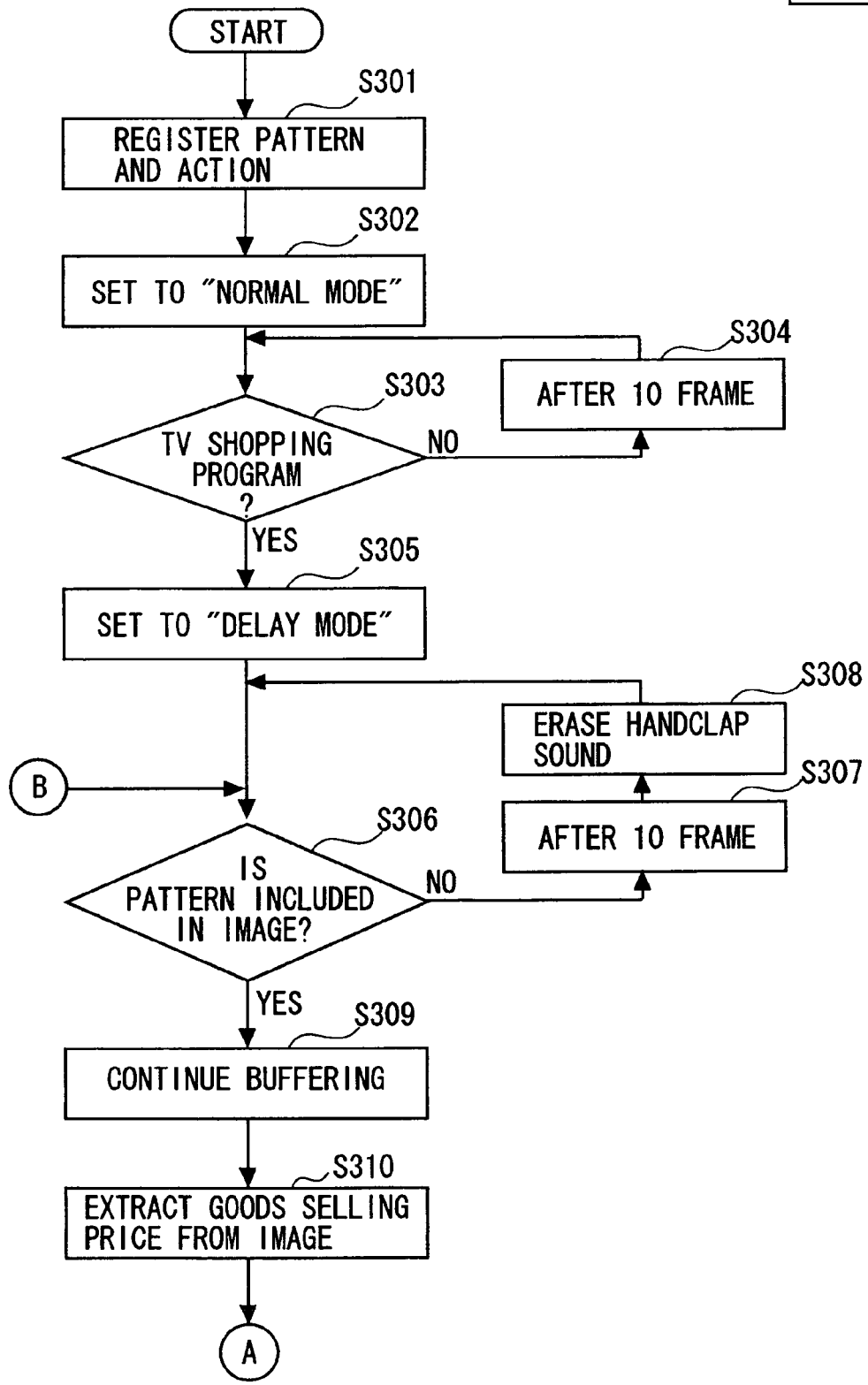
FIGS. 15A and 15B are a flowchart showing a process flow in an embodiment.
Figure 15B:
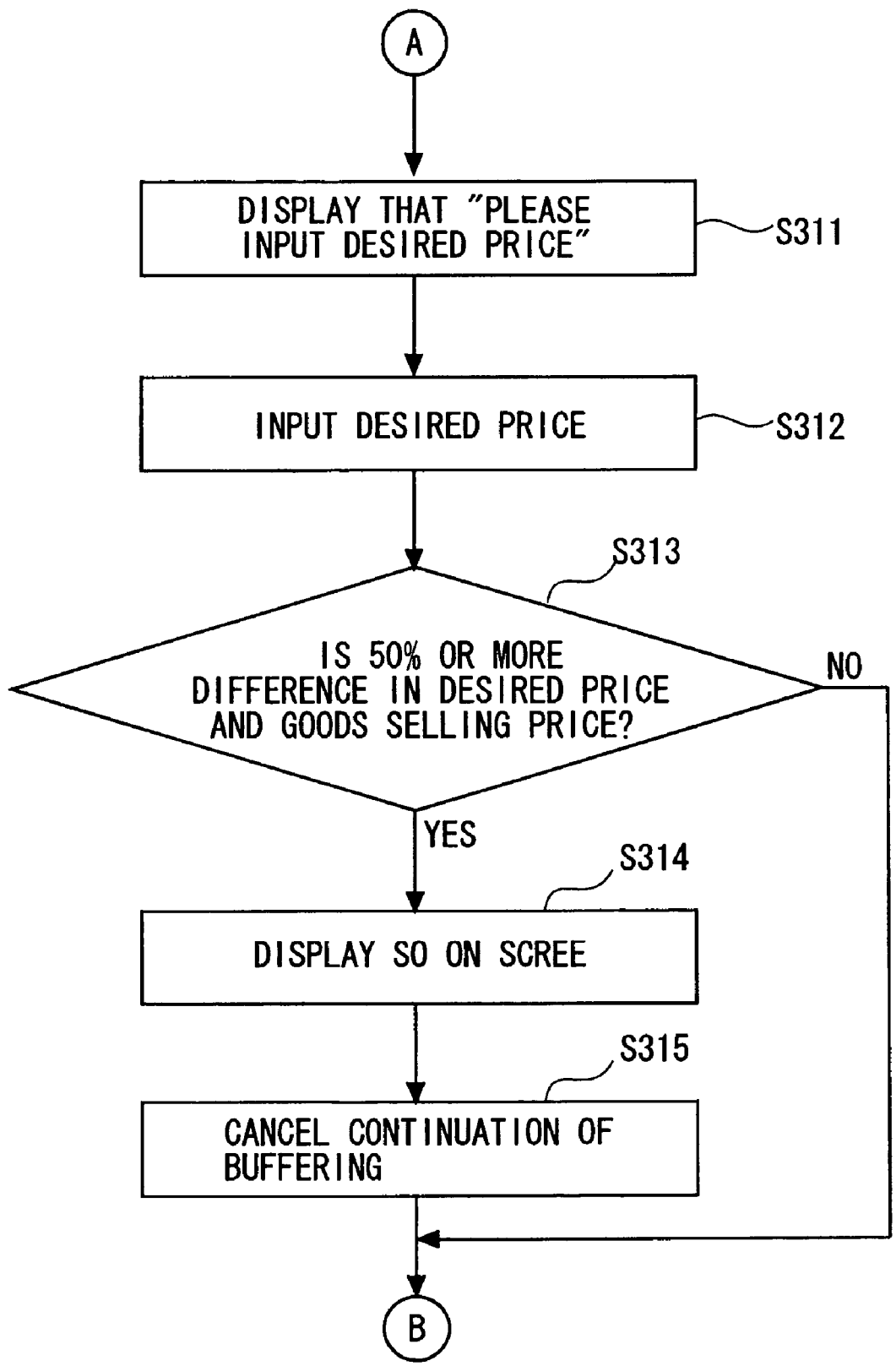

FIGS. 15A and 15B are a flowchart showing the process flow in a construction example 2.

First the user registers the pattern and the action by operating the controller 139 (Step S301). At this point, it is assumed that image patterns of "Yen" and "Y" and the audio pattern of "Handclap" are registered. The contents that "when "Yen" or "Y" emerges, the image is undisplayed to encourage the user to input a desired price, and the desired price is compared to the goods selling price to display the comparison result on the screen" are designated as the action associated with the image pattern. The contents that "erase audio during handclap" are designated as the action associated with the audio pattern.

When the registration of the pattern and action is completed, the apparatus sets an operation mode to a "normal mode" to start the display of the input program (step S302).

In the "normal mode", the A/D conversion of the inputted image signal and audio signal is performed, and the image signal and audio signal are stored in the buffer memory 133. Then, the image signal and audio signal are sequentially read in the FIFO manner, and the image signal and audio signal are outputted to the display 1311 in substantially real time. At this point, the comparator 134 performs the pattern recognition processing to the image in each 10 frames to automatically determine whether the image signal belongs to the TV shopping program (Steps S303 and S304). For example, in the case where the words such as "teleshop" and "television shopping" are included and a character area has the size at least 20% of the image size, it is determined that the image signal belongs to the TV shopping program.

When the start of the TV shopping program is detected, the apparatus sets the operation mode to a "delay mode" (Step S305). The image signals and audio signals of five seconds are buffered, and the five-second delayed image and sound are outputted.

The comparator 134 performs the pattern recognition processing to the image in each 10 frames to determine whether the image patterns of "Yen" or "Y" is included in the image (Steps S306 and S307). For example, in the case where numeric+"Yen" or "Y"+numeric is included in the image and the character area has the size at least 10% of the image size, it may be determined that the pattern is included. The comparator 134 also determines in parallel whether "handclap" is included in the audio signal by the speech recognition processing. When the handclap is detected, the audio output is temporarily stopped (Step S308).

When the pattern is included (YES in Step S306), the display and the audio output are temporarily stopped. However, the buffering of the image and audio is continuously performed (Step S309).

The goods selling price is extracted by the character recognition processing from the image in which the pattern is included, and the goods selling price is stored in the memory (Step S310). Then, as with the construction example 1, the image of "Please input desired price" generated by the message data creation unit 138 is displayed (Step S311), and the input of the desired price is received from the user (Step S312).

When the desired price is inputted, the output control unit 1310 compares the desired price to the goods selling price extracted from the image to determine whether the difference of 50% or more exists between both the prices (Step S313). When the difference is 50% or more, the message data creation unit 138 creates the message that the difference is 50% or more, and the message is displayed on the display 1311 (Step S314). Then, the buffering is cancelled (Step S315), and the flow returns to the process in Step S306.

According to the process of the construction example 2, the following advantages are obtained. (1) The apparatus automatically detects the start of the TV shopping program. (2) The determination whether the pattern is included is performed not in each frame, but in plural frames. (3) The pattern and the action are previously inputted. (4) Not only the image but the audio information can be registered as the pattern.

The above construction examples are illustrated as only a specific example of the invention. The scope of the invention is not limited to the above embodiments, but various modifications could be made within the technical thought of the invention.

For example, although in the construction examples, the TV shopping program is illustrated, the invention can preferably be applied to other contents. In the case where the display of the contents including a violence scene or a destruction scene is restricted, a violence sound or a destruction sound may be registered as the pattern. In the case where the display of the contents inducing photosensitive epilepsy is restricted, the image in which high-intensity blinking is repeated may be registered as the pattern.

The action, in which the user is caused to input the answer by registering the audio "correct answer" or "answer" as the pattern to automatically pause the screen immediately before the answer is announced in the quiz program, can also be performed. That is, the invention has the advantage that the non-interactive contents are made interactive in a pseudo manner.

As described above in detail, according to the embodiments of the invention, it is determined whether the previously registered pattern is included in the inputted image signal and/or audio signal or not, and the output of the harmful contents can appropriately be restricted without adding the attribute information to the contents by performing the previously designated action with the output means for outputting the image and/or the audio, when the pattern is included. The method of the invention may be distributed in the form of a computer program which is installed and executed in the image display apparatus.

What is claimed is:

1. A television apparatus comprising:
    a receiving unit that receives a digital broadcast signal comprising video data, audio data, and data broadcast data;
    an audio signal detection unit that detects specific audio data from the audio data received by the receiving unit; and
    a control unit that controls an image processor,
    wherein the specific audio data relates a specific audio keyword, which is predetermined by a broadcaster and is transmitted as data broadcast data, to a characteristic keyword in a television program,
    wherein the audio signal detection unit generates a control signal for controlling the control unit in a case of detecting the specific audio data, and
    wherein the control unit controls the image processor according to the control signal so as to synthesize an image including at least one of specific image data and text data, which are related to the specific audio keyword, and an image based on the video data, and the control unit controls the image processor according to the control signal so as to display the synthesized image on a screen of a display device.

2. A television apparatus according to claim 1, wherein the data broadcast data includes at least one of the specific image data and the text data.

3. A television apparatus according to claim 1, further comprising a keyword database that stores the specific image data related to the specific audio keyword.

4. A control method of a television apparatus comprising the steps of:
    receiving a digital broadcast signal comprising video data, audio data, and data broadcast data;
    detecting a specific audio data from the received audio data, and
    controlling an image processor,
    wherein the specific audio data relates a specific audio keyword, which is predetermined by a broadcaster and is transmitted as data broadcast data, to a characteristic keyword in a television program; and
    wherein the detecting step generates a control signal for the controlling step in a case of detecting the specific audio data, and
    wherein the controlling step controls the image processor according the control signal so as to synthesize an image from at least one of specific image data and text data, which are related to the specific audio keyword, with an image based on the video data, and the controlling step controls the image processor so as to display the synthesized image on a screen of a display device.

* * * * *